United States Patent [19]

Kato et al.

[11] Patent Number: 4,542,107
[45] Date of Patent: Sep. 17, 1985

[54] DIELECTRIC CERAMIC COMPOSITIONS

[75] Inventors: Junichi Kato, Osaka; Yoichirou Yokotani, Ibaragi; Masamitsu Nishida, Osaka; Hiromu Ouchi, Toyonaka, all of Japan

[73] Assignee: Matsushita Electric Industrial Co., Ltd., Osaka, Japan

[21] Appl. No.: 615,241

[22] Filed: May 30, 1984

[30] Foreign Application Priority Data

May 30, 1983 [JP] Japan ............... 58-91312

[51] Int. Cl.$^4$ ............... C04B 35/00
[52] U.S. Cl. ............... 501/134; 361/321
[58] Field of Search ............... 501/134; 361/321

[56] References Cited

U.S. PATENT DOCUMENTS

| | | | |
|---|---|---|---|
| 4,078,938 | 3/1978 | Yonezawa et al. | 501/134 |
| 4,236,928 | 12/1980 | Yonezawa et al. | 501/134 |
| 4,255,272 | 3/1981 | Ogawa | 501/134 |
| 4,265,668 | 5/1981 | Fujiwara et al. | 501/134 |
| 4,308,571 | 12/1981 | Tanei et al. | 501/134 |
| 4,339,544 | 7/1982 | Sakabe et al. | 501/134 |
| 4,379,319 | 4/1983 | Wilson | 501/134 |
| 4,386,387 | 5/1983 | Tanei et al. | 501/134 |

Primary Examiner—Howard S. Williams
Assistant Examiner—Terryence Chapman
Attorney, Agent, or Firm—Wenderoth, Lind & Ponack

[57] ABSTRACT

A dielectric ceramic composition consisting essentially of $Pb(Mg_{\frac{1}{3}}Nb_{\frac{2}{3}})_x(Zn_{\frac{1}{3}}Nb_{\frac{2}{3}})_y(Fe_{\frac{2}{3}}W_{\frac{1}{3}})_zO_3$, wherein $x+y+z=1$, and further containing $MnO_2$ in amount of 0.05 to 1.0 weight %.

2 Claims, 1 Drawing Figure

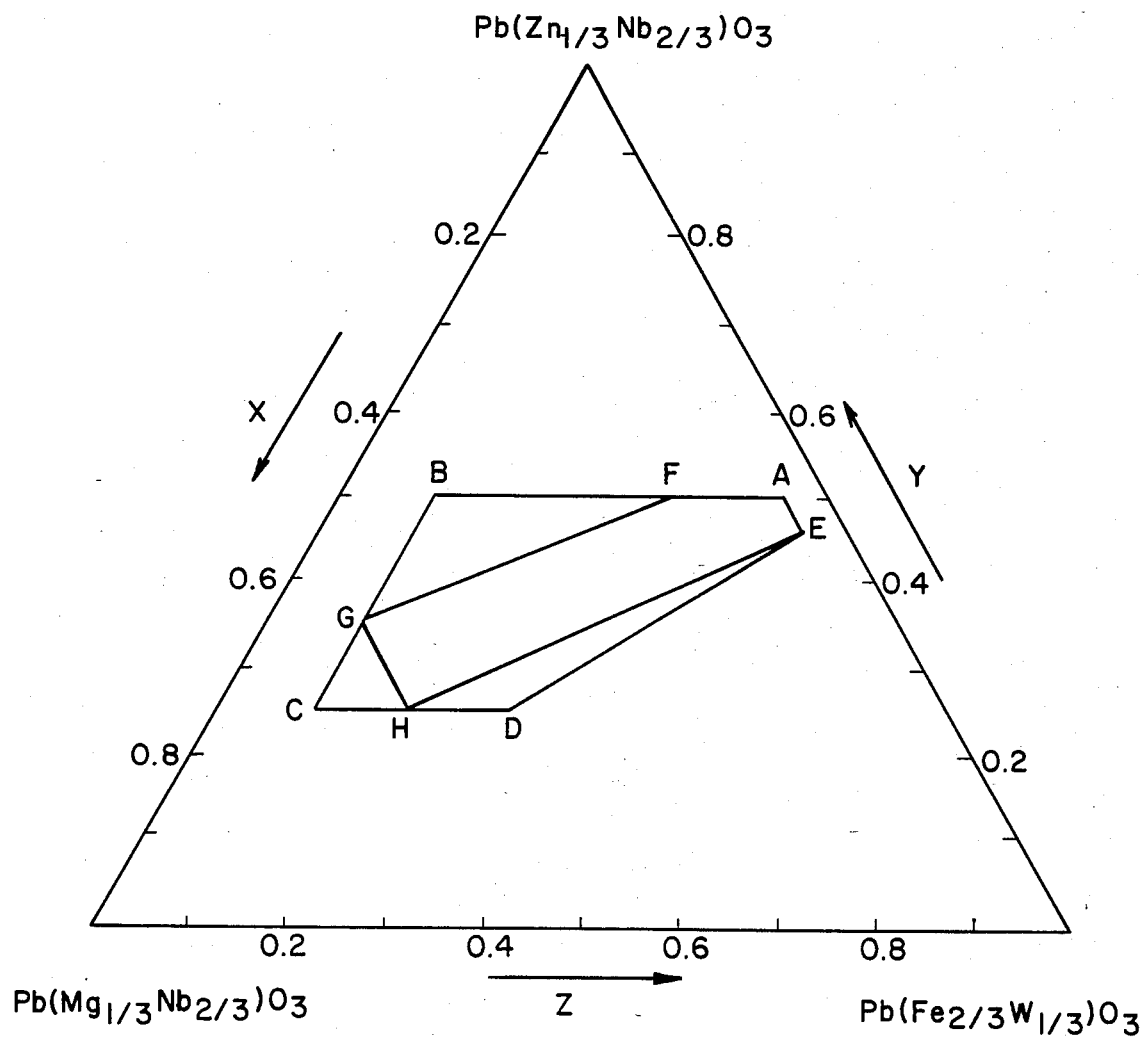

DIELECTRIC CERAMIC COMPOSITIONS

BACKGROUND OF THE INVENTION

The present invention relates to dielectric ceramic compositions allowing low-temperature sintering, and exhibiting a high dielectric constant, low temperature coefficient of the dielectric constant, and low dielectric loss, and being suitable for use in ceramic capacitors.

As promising ceramic compositions for this purpose those essentially consisting of $BaTiO_3$ have been widely used as materials of high dielectric constant. The dielectric constant of this material relates to its temperature coefficient. A dielectric material which exhibits a high dielectric constant, has a relatively high temperature coefficient of the dielectric constant, and a dielectric material which exhibits a low dielectric constant has a relatively low temperature coefficient of the dielectric constant.

The temperature coefficient of a ceramic capacitor is established by JIS (Japanese Industrial Standard) or EIA (U.S. Electronics Industries Association) Standard. For example, the temperature coefficient of a dielectric constant adapted to YF rating of JIS, which means that the temperature coefficient lies within a range of $+30$ to $-80\%$ at an operating temperature of $-25°$ to $85°$ C., is approximately equivalent to Y5V rating of EIA Standard which means that the temperature coefficient lies within a range of $+22$ to $-82\%$ at an operating range of $-30°$ to $85°$ C. A dielectric material which exhibits a dielectric constant of 10,000, is adapted to YF or Y5V. The temperature coefficient of a dielectric constant adapted to YD rating of JIS, which means that the temperature coefficient lies within a range of $+20$ to $-30\%$ at an operating temperature of $-25°$ to $85°$ C., is approximately equivalent to Y5T rating of EIA Standard which means that the temperature coefficient lies within a range of $+22$ to $-33\%$ at an operating range of $-30°$ to $85°$ C. A dielectric material which exhibits a dielectric constant of 4,000 is adapted to YD or Y5T. However, $BaTiO_3$ system ceramics must be sintered at a very high temperature in the range of $1300°$ to $1400°$ C., so that where they are used as a dielectric material of multilayer ceramic capacitors, expensive metals such as platinum or palladium which can stand such high sintering temperature should be used as internal electrodes of the capacitors. Therefore there has still been a demand for dielectric ceramic materials which can be sintered at a temperature as low as below $1000°$ C. for enabling the use of relatively cheap metal such as silver for the internal electrodes.

U.S. Pat. No. 4,078,938 discloses binary system ceramic compositions of $PbFe_{2/3}W_{1/3}O_3$—$PbFe_{1/2}Nb_{1/2}O_3$ which can be sintered at a relatively low temperature, and which exhibit a high dielectric constant of 20,000. However, the ceramics have a high temperature coefficient of the dielectric constant, which is adapted to only YF rating of JIS or Y5V rating of EIA Standard.

U.S. Pat. No. 4,236,928 discloses binary system ceramic compositions of $Pb(Fe_{2/3}W_{1/3})O_3$—$Pb(Zn_{1/2}Nb_{1/2})O_3$ which can be sintered at a temperature below $1000°$ C., and which exhibit a dielectric constant of 5000. However, the ceramics also have a high temperature coefficient of the dielelctric constant which is adapted to a Z5U rating of EIA Standard which means that the temperature coefficient lies within a range of $+22$ to $-56\%$ at an operating range of $+10°$ to $+85°$ C.

Summary of the Invention

The object of the present invention is to provide dielectric ceramic composition which can be sintered at low temperature, and exhibit low dielectric loss and a low temperature coefficient of the dielectric constant.

In accomplishing this object, a ceramic composition of the present invention is a dielectric ceramic composition consisting essentially of a material represented by the formula.

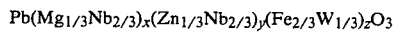

$$Pb(Mg_{1/3}Nb_{2/3})_x(Zn_{1/3}Nb_{2/3})_y(Fe_{2/3}W_{1/3})_zO_3$$

wherein $x+y+z=1$ and which contains $MnO_2$ as an additive.

These novel compositions of the present invention can be sintered at a temperature in the range $850°$ C. to $950°$ C., and have a high dielectric constant of 4000 or more, and low temperature coefficients of the dielectric constant which meet the YD rating of JIS or YST rating of EIA Standard.

Brief Description of the Drawing

The drawing is a composition diagram of $Pb(Mg_{1/3}Nb_{2/3})O_3$—$Pb(Zn_{1/3}Nb_{2/3})O_3$—$Pb(Fe_{2/3}W_{1/3})O_3$ ternary system.

DETAILED DESCRIPTION OF THE INVENTION

The compositions herein may be prepared in accordance with various well-known ceramic procedures.

The starting materials, viz, lead oxide (PbO), zinc oxide (ZnO), niobium oxide ($Nb_2O_5$), magnesium oxide (MgO), ferric oxide ($Fe_2O_3$), tungsten oxide ($WO_3$) and manganese oxide ($MnO_2$) all of relatively pure grade, were intimately mixed in a ball mill with distilled water and agate balls for 15 hours. Thereafter the mixture was dried and then calcined at $750°$ C. for 2 hours. Thus obtained materials were wet ground in a ball mill, dried, mixed with polyvinyl alcohol as a binder solution, and then pressed into columns of about 13 mm in diameter and about 10 mm in length at a pressure of 700 Kg/cm². After burning out the binder at about $700°$ C., the pressed columns were put into a magnesia crucible and were sintered at a temperature of $850°$ C. for 2 hours. The sintered bodies were cut into discs of about 1 mm in thickness, and Cr-Au electrodes were attached on both surfaces of the discs by a method of vacuum evaporation.

Various properties of the ceramic disks thus obtained are shown in Table 1. The dielectric constant ($\tau\gamma$) and the dielectric loss ($\tan\delta$) were measured at a frequency of 1 KHz and a voltage of 1 V at $20°$ C. The temperature coefficients of the dielectric constant were obtained by measuring a dielectric constant at a temperature range of $-25°$ to $85°$ C. and calculated with reference to the dielectric constant at $20°$ C.

TABLE 1

| No. | Composition x | y | z | MnO$_2$ (wt %) | $\epsilon r$ | Change of $\epsilon r$ (%) −25° C. | 85° C. | tan δ (%) −25° C. | 20° C. | 85° C. |
|---|---|---|---|---|---|---|---|---|---|---|
| 1* | 0.03 | 0.47 | 0.5 | 0.2 | 3300 | −26 | −33 | 2.4 | 0.67 | 0.47 |
| 2* | 0.1 | 0.4 | 0.5 | 0.2 | 5700 | −3 | −47 | 1.2 | 0.86 | 0.94 |
| 3* | 0.1 | 0.5 | 0.4 | 0 | 5800 | −32 | −37 | 5.4 | 1.22 | 21.0 |
| 4 | 0.1 | 0.5 | 0.4 | 0.2 | 4200 | −29 | −28 | 1.3 | 0.74 | 0.77 |
| 5* | 0.15 | 0.45 | 0.4 | 0 | 5400 | −29 | −31 | 2.9 | 1.1 | 34.0 |
| 6 | 0.15 | 0.45 | 0.4 | 0.2 | 4300 | −24 | −20 | 1.2 | 0.57 | 0.84 |
| 7 | 0.15 | 0.45 | 0.4 | 0.5 | 4100 | −22 | −19 | 0.94 | 0.42 | 1.1 |
| 8* | 0.15 | 0.55 | 0.3 | 0.2 | 4800 | −37 | −24 | 0.93 | 0.51 | 0.78 |
| 9* | 0.2 | 0.45 | 0.35 | 0 | 5600 | −22 | −31 | 4.9 | 1.6 | 39.0 |
| 10 | 0.2 | 0.45 | 0.35 | 0.2 | 4800 | −23 | −29 | 1.7 | 0.58 | 0.41 |
| 11 | 0.3 | 0.45 | 0.25 | 0.2 | 5400 | −29 | −27 | 2.1 | 1.1 | 0.53 |
| 12* | 0.3 | 0.4 | 0.3 | 0 | 6500 | −31 | −35 | 2.6 | 1.3 | 36.0 |
| 13 | 0.3 | 0.4 | 0.3 | 0.2 | 5800 | −26 | −29 | 1.7 | 0.91 | 0.43 |
| 14 | 0.3 | 0.4 | 0.3 | 0.5 | 5300 | −26 | −28 | 0.94 | 0.73 | 0.62 |
| 15 | 0.3 | 0.4 | 0.3 | 1.0 | 4900 | −25 | −28 | 0.92 | 1.3 | 2.7 |
| 16* | 0.3 | 0.4 | 0.3 | 2.0 | 4200 | −25 | −27 | 1.1 | 1.9 | 7.3 |
| 17 | 0.3 | 0.35 | 0.35 | 0.2 | 5100 | −21 | −29 | 1.3 | 0.81 | 0.72 |
| 18* | 0.3 | 0.55 | 0.15 | 0.2 | 6200 | −36 | −24 | 1.1 | 0.76 | 0.83 |
| 19* | 0.4 | 0.4 | 0.2 | 0 | 7800 | −31 | −33 | 5.7 | 2.3 | 37.0 |
| 20* | 0.4 | 0.4 | 0.2 | 0.04 | 7500 | −30 | −31 | 3.2 | 1.9 | 18.0 |
| 21 | 0.4 | 0.4 | 0.2 | 0.2 | 6400 | −29 | −25 | 2.1 | 0.84 | 0.60 |
| 22 | 0.4 | 0.4 | 0.2 | 1.0 | 5200 | −27 | −24 | 1.2 | 0.71 | 1.2 |
| 23 | 0.4 | 0.3 | 0.3 | 0.2 | 6300 | −26 | −28 | 1.9 | 0.79 | 0.64 |
| 24* | 0.5 | 0.45 | 0.05 | 0.2 | 5900 | −41 | −31 | 1.6 | 0.63 | 0.75 |
| 25 | 0.5 | 0.35 | 0.15 | 0.2 | 6600 | −30 | −29 | 1.7 | 0.73 | 0.77 |
| 26* | 0.5 | 0.2 | 0.3 | 0.2 | 7200 | −25 | −38 | 1.9 | 0.81 | 0.86 |
| 27 | 0.65 | 0.25 | 0.1 | 0.2 | 5700 | −30 | −30 | 2.3 | 0.95 | 1.1 |

1 Basic compositions Pb(Mg$_{1/3}$Nb$_{2/3}$)$_x$(Zn$_{1/3}$Nb$_{2/3}$)$_y$(Fe$_{2/3}$W$_{1/3}$)$_z$O$_3$
2 Compositions of the Nos. with an asterisk are outside the scope of the present invention.

From Table 1 it is obvious that the ceramic compositions within the range of the polygon ABCDE in the ternary system composition diagram of the drawing provide a low temperature coefficient of the dielectric constant which is adapted to YD range rating of JIS and Y5T rating of EIA Standard, where the points A,B,C,D and E are represented by the proportions x,y and z as shown in Table 2.

TABLE 2

|   | x | y | z |
|---|---|---|---|
| A | 0.05 | 0.5 | 0.45 |
| B | 0.4 | 0.5 | 0.1 |
| C | 0.65 | 0.25 | 0.1 |
| D | 0.45 | 0.25 | 0.3 |
| E | 0.05 | 0.45 | 0.5 |

The ceramic compositions have high dielectric constant of 4100 to 6600 which is higher than BaTiO$_3$ systems, and low dielectric loss tan δ of lower than 2.5% at a temperature range of −25° C. to 85° C. Especially, the ceramic compositions within the range of the polygon AFGHE in the ternary system composition diagram of the drawing are suitable for a capacitor, because the Curie temperature of these compositions lie in a temperature range of 20 to 40° C., where the point F, G and H are represented by the proportions x, y and z as shown in Table 3.

TABLE 3

|   | x | y | z |
|---|---|---|---|
| F | 0.15 | 0.5 | 0.35 |
| G | 0.55 | 0.35 | 0.1 |
| H | 0.55 | 0.25 | 0.2 |

The reasons for the limitations in Table 2 are as follows.

If x is smaller than 0.05, the dielectric constant is low and the temperature coefficient of the dielectric constant is high. If y is larger than 0.5 or smaller than 0.25, the temperature coefficient of the dielectric constant is high. If z is smaller than 0.1, the temperature coefficient of the dielectric constant is high. The compositions which lie outside of line DE in the ternary system composition diagram exhibit a high temperature coefficient of the dielectric constant. If MnO$_2$ content is smaller than 0.05 wt %, the dielectric loss tan δ at the temperature above room temperature is as high as 10%, so that the ceramic compositions do not fulfill the requirement for a capacitor. If MnO$_2$ content is larger than 1 wt%, tan δ becomes larger.

As apparent from this example, the ternary ceramic compositions which contain MnO$_2$ as an additive according to the present invention, have a low sintering temperature below 950° C., so that relatively cheap metal such as silver can be employed as internal electrodes of multilayer ceramic capacitors. It will be evident that the starting materials to be used in the present invention are not limited to those used in the above mentioned example. Other oxides or compounds which are easily decomposed at elevated temperature may be used in place of the starting materials of the above-mentioned example.

What is claimed is:

1. A ceramic composition consisting essentially of Pb(Mg$_{1/3}$Nb$_{2/3}$)$_x$(Zn$_{1/3}$Nb$_{2/3}$)$_y$(Fe$_{2/3}$W$_{1/3}$)$_z$O$_3$ wherein $x+y+z=1$ and the proportions of x,y and z fall within the ranges represented by the polygon ABCDE in the accompanying drawing, and further containing MnO$_2$ in amount of 0.05 to 1.0 wt%.

2. A ceramic composition as claimed in claim 1, wherein the proportions of x,y and z fall within the ranges represented by the polygon AFGHE in the accompanying drawing.

* * * * *